United States Patent Office 3,650,918
Patented Mar. 21, 1972

3,650,918
ELECTROCHEMICAL OXIDATION OF OLEFINIC COMPOUNDS
Morris A. Johnson, Paul H. Washecheck, Kang Yang, and Charles M. Starks, Ponca City, Okla., assignors to Continental Oil Company, Ponca City, Okla.
No Drawing. Filed Aug. 27, 1969, Ser. No. 853,513
Int. Cl. B01k 1/00; C07b 3/00
U.S. Cl. 204—80
10 Claims

ABSTRACT OF THE DISCLOSURE

Olefinic compounds are electrolytically oxidized to carbonyl compounds in the presence of an oxidation catalyst consisting of a Group VII metal or compound thereof. The catalyst, which is reduced during the oxidation of the olefinic compounds, is regenerated by a catalyst regeneration agent present in the anolyte. The reduced catalyst regeneration agent is then regenerated electrolytically, thereby preventing any net change in the catalyst or the catalyst regeneration agent.

BACKGROUND OF THE INVENTION

Field of the invention

This invention relates to the oxidation of olefinic compounds. In one aspect, this invention relates to the electrochemical oxidation of olefinic compounds to carbonyl compounds in the presence of a catalyst wherein the catalyst is regenerated electrolytically. In still another aspect, this invention relates to the electrochemical oxidation of olefinic compounds in the presence of a catalyst wherein said catalyst is a Group VIII metal, an oxide of a Group VIII metal, or an inorganic salt compound containing a Group VIII metal.

Brief description of the prior art

Metals and metallic ions, in aquated form or in coordination with non-metallic elements, often initiate commercially attractive organic reactions. Typical examples of such organic reactions include oxidation of olefins by permanganate, polymerization of olefins by a Ziegler-type catalyst, and various other transition initiated chemical reactions. The initiators in these reactions are often quite expensive, and, unlike true catalyst, they are usually consumed in the reaction.

One of the successful methods used in the past to regenerate the spent metals or metallic ions in situ is the use of Cu+—Cu++ couple as was done in the so-called Wacker process. In this process the plus 2 state of palladium is regenerated by oxidation with Cu++. This couple, however, is a weak oxidizing agent, i.e.,

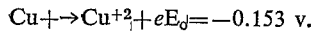
$$Cu^+ \rightarrow Cu^{+2} + eE_d = -0.153 \text{ v.}$$

and hence has only limited applicability.

Another regeneration method employed in the past in the oxidation type reactions involving nonmetallic reaction initiators is the electrochemical regeneration of iodate ion consumed in the oxidation of starch.

The prior art methods have been impractical for one reason or another. For example, in many prior art methods expensive reaction initiators are consumed which renders the prior art process uneconomical. Further, many of the initiators employed in the past in the oxidation of olefins are unstable and highly toxic. In addition, problems have been encountered in the past in the electrochemical oxidation of olefins in that undesired side reactions occur which reduce the yield of the product while at the same time making it difficult to recover the desired product. Thus, new processes are constantly being sought which overcome the many problems such as enumerated above in the electrochemical oxidation of olefinic compounds.

OBJECTS OF THE INVENTION

An object of the invention is to provide an efficient method for the electrochemical oxidation of olefinic compounds.

Another object of the invention is to provide an effective method for the electrochemical oxidation of olefinic compounds in the presence of an oxidation catalyst.

Another object of this invention is to provide a method for the electrochemical oxidation of olefinic compounds in the presence of an oxidation catalyst wherein the oxidation catalyst is regenerated thereby preventing any net change in the catalyst component.

Another object of this invention is to provide an effective method for the electrochemical oxidation of olefinic compounds where undesirable side reactions are readily maintained at a minimum level.

These and other objects and advantages of the present invention will be apparent to those skilled in the art from a reading of the following detailed description.

SUMMARY OF THE INVENTION

According to the present invention a process for the electrochemical oxidation of olefinic compounds in the presence of an oxidation catalyst is provided wherein the olefinic compounds are oxidized to their corresponding carbonyl compounds while, at the same time, preventing consumption of the catalyst.

Further according to the invention, we have found a process for the electrochemical oxidation of olefinic compounds wherein said oxidation is carried out in the presence of an oxidation catalyst selected from the group consisting of a Group VIII metal, an oxide of a Group VIII metal, or an inorganic salt compound containing a Group VIII metal.

Further according to the invention, we have found a process for oxidizing olefinic compounds in the presence of an oxidation catalyst selected from the group consisting of a Group VIII metal, an oxide of a Group VIII metal, or an inorganic salt compound containing a Group VIII metal wherein the reduced catalyst is continuously reoxidized by an oxidizing agent and the resulting reduced oxidizing agent is continuously reoxidized by electrochemical means thereby preventing any net change in the catalyst or oxidizing agent.

DESCRIPTION OF PREFERRED EMBODIMENTS

The process of our invention provides for the oxidation of an olefinic compound without the loss of expensive catalyst and catalyst regeneration components by combining principles of eelctrochemistry and metallic catalysis.

We have found that, by employing an oxidation catalyst wherein said oxidation catalyst is a Group VIII metal, an oxide of a Group VIII metal, or an inorganic salt compound containing a Group VIII metal, olefinic compounds can be readily oxidized to their corresponding carbonyl compounds without the consumption of the catalyst. The term olefinic compound as used herein means compounds which contain a double bond in the molecule. The term "carbonyl compounds" as used herein means compounds containing a C=O group, such as the aldehydes, ketones, and carboxylic acids. As is readily apparent to those skilled in the art, the resulting oxidation compound will depend upon the particular olefinic compound employed as the starting material, the particular catalyst system employed, and the extent to which the oxidation of said olefinic compound is allowed to progress. For example, when osmium tetraoxide is employed as the oxidation catalyst in the presence of periodate, the resulting product is primarily an aldehyde, with a minor amount of carboxylic acid, whereas when ruthenium tetraoxide is employed as the catalyst in the presence of periodate, the resulting produce is the corresponding carboxylic acid, or a mixture of aldehyde and carboxylic acid, depending upon the degree of oxidation and the amount of periodate present.

The oxidation catalyst which can be employed in the process of the present invention can be any of the oxide constituents of the Group VIII metals, the inorganic salt constituents of the Group VIII metals, or the Group VIII metals alone. Any suitable inorganic salt containing a Group VIII metal can be used, such as ruthenium tetrachloride pentahydrate, ruthenium hydroxide, osmium dichloride, osmium tetrachloride and the like. Especially desirable results have been obtained wherein the oxidation catalyst employed is ruthenium tetraoxide, ruthenium dioxide, or osmium tetraoxide.

The amount of oxidation catalyst employed in the process of the present invention is small compared with that required in chemical oxidation. The reason for this is that the catalyst component is continuously regenerated in the process of the present invention as will be discussed in detail hereinafter. Thus, while the amount of catalyst can vary widely, we have found an effective amount is within the range of about 0.001 to about 2 weight percent catalyst based on the weight of the olefinic compound to be oxidized. Desirable results have been obtained where the catalyst is present in a range of about 0.01 to 0.2 weight percent.

In practicing the process of our invention one employs an electrolytic oxidation zone having an anolyte-containing zone and a catholyte-containing zone which are separated by a semi-permeable partition. A catalytic oxidation zone wherein the oxidation of the olefinic compounds occurs is arranged so as to be separate from the electrochemical oxidation zone but in fluid communication with the anolyte-containing zone so that the anolyte is continuously circulated between the catalytic oxidation zone and the anolyte-containing zone. As will be apparent to those skilled in the art numerous types of electrochemical cells can be employed or modified as the electrolytic oxidation zone to practice the process of our invention. Likewise, any suitable material can be employed as the anode and cathode of the electrolytic cell. Desirable results have been obtained where lead is employed as the anode and carbon is employed as the cathode.

The anolyte employed in the process of the present invention is an aqueous solution containing from about 1 to 50 weight percent of a catalyst regeneration agent and from about 0.001 to 0.2 weight percent catalyst. The catalyst is a Group VIII metal, an oxide of a Group VIII metal, or an inorganic salt containing a Group VIII metal and the catalyst regeneration agent is an acid constituent. Desirable results have been obtained where the acid constituent is selected from the group consisting of iodic acid, periodic acid, a mixture of iodic and periodic acid or its equivalent such as a mixture of sulfuric acid and sodium iodate. When desirable, from about 0.1 to 2 weight percent of a quaternary ammonium salt or a quaternary phosphonium salt can be added to the anolyte. Examples of such quaternary salts are disclosed in U.S. Pat. 3,297,634 which is herein incorporated by reference.

The catholyte employed in the process is an aqueous solution containing from about 1 to 20 weight percent of an alkali metal hydroxide or quaternary ammonium hydroxide. The alkali metal constituents of the alkali metal hydroxide which are most commonly used are lithium, sodium and potassium.

The catalytic oxidation zone, where the oxidation of the olefinic compounds occurs, contains an organic solution comprising from about 1 to 100 weight percent olefinic compound. As is apparent, the organic solution can contain as little as 1 percent by weight of the olefinic compound to be oxidized. When less than 100% olefinic compound is employed the remaining constituent is an inert organic solvent. The inert organic solvent can be present up to about 99 weight percent.

The solvent employed in the catalytic oxidation zone can be any suitable solvent which is inert to the oxidation reaction. Suitable solvents are halogenated compounds, such as carbon tetrachloride, chloroform, hexachloroethane, and the like; ketone solvents, such as 2-hexanone, cyclohexanone and the like; carboxylic acids containing from about 3 to 10 carbon atoms, such as propionic acid, butyric acid, valeric acid, hexanoic acid, decanoic acid, and the like; straight, branched chain and cyclic paraffins containing from about 5 to 30 carbon atoms, such as pentane, hexane, heptane, octane, decane, pentadecane, eicosane, pentacontane, tricontane, 2-methylpentane, 2-ethylhexane, 2,2,4-trimethylpentane, 2,6,10-trimethyldodocane, 2,6,10,14 - tetramethylhexadecane, 2,6,10,14,18,22 - hexamethyltetracontane, cyclohexane, decaline, 1-decylcyclohexane, cholestane, and the like; and aromatic compounds such as benzene, toluene, xylenes, naphthalene, anthracene and the like.

The olefinic compound which is present in the catalytic oxidation zone in an amount from about 1 to 100 weight percent can be any suitable compound which oxidizes in the presence of the oxidation catalyst as hereinbefore described. Such olefinic compounds are olefins, oleic acid, linoleic acid, methyl oleate, soybean oil, and the like. The olefins which can be oxidized by the process of the invention can vary widely in size (molecular weight) but generally range from about 2 to 40 carbon atoms per molecule, and more desirably from about 2 to 18 carbon atoms per molecule. The olefins can be acyclic, cyclic, or aryl in configuration. Examples of olefins which can be oxidized by the process of the present invention are ethylene, propylene, 1-butene, 2-butene, 1-pentene, 1-hexene, 1-heptene, 2-heptene, 1-octene, 4-octene, 1-nonene, 3-nonene, 1-decene, 4-decene, 1-dodecene, 6-dodecene, 1-tetradecene, 7-tetradecene, 1-hexadecene, 8-hexadecene, 1-octadecene, 9-octadecene, 1-eicosene, 1-tetracosene, 1-octacosene, 1-triacontene, 1-tetratriacontene, 1-tetracontene, 3-methyl-1-pentene, 2-ethyl-1-hexene, 2-methyl-1-undecene, 3,5,8-trimethyl-1-pentadecene, 4-isopropyl-3-heptacosene, 2-hexyl - 4 - methyl-7-octacosene, 2,2-dimethyl-7-heptyl-13-hexyl-9-pentacosene, cyclopentene, cyclohexene, 1,2,4,5-tetramethylcyclohexene, 4-pentadecylcyclohexene, 5-tricosylcycloheptene, 5-cholestene, butadiene, 1,4-cyclohexadiene, 1,6-cyclodecene, 1,17-octadecadiene, styrene, indene, acenaphthylene, 9-phenyl-1-decene, 6-(4,8-dibutyl-2 - naphthyl) - 2 - hexene, 5-(9-octadecyl-3-anthracyl)-3-octene, and the like.

In practicing the process for our invention the electrochemical cell of the electrolytic oxidation zone and reaction chamber of the catalytic oxidation zone are filled with their respective solutions and the circulation of the anolyte through the reaction chamber is commenced. Electric current is then applied to the electrochemical cell to carry out the process. The step of oxidation and regeneration of the various components are as follows:

(1) the catalyst component in contacting the olefinic compound oxidizes said olefinic compound thus producing a reduced valence state of the catalyst;
(2) the reduced catalyst is then regenerated by the acid component in the anolyte, thus producing a reduced valence state of the acid component; and
(3) the reduced acid component is regenerated by the passage of current through the electrochemical cell with the liberation of hydrogen gas at the cathode and oxidation of the reduced acid component at the anode.

As evident, reaction (1) occurs in the organic phase in the catalytic oxidation zone, reaction (2) occurs in the aqueous phase of the catalytic oxidation zone and reaction (3) occurs in the electrolytic oxidation zone. The rates of all reactions balance thus providing an overall stoichiometry for the oxidation of the olefinic compounds with net consumption of water and electricity but no net loss of the catalyst and acid components.

The conditions of current density and potential difference required by our process are those required to regenerate the reduced acid component as set forth in reaction (3) above. Usually, the electric current employed is more than 100% theoretical because the current efficiency is somewhat lower.

After the desired amount of electric current has been passed through the electrolytic oxidation zone the product is recovered from the catalytic oxidation zone and separated from the organic phase by any suitable means which are well known in the art.

The process of our invention can be conducted in either a batch process or a continuous process. When a continuous process is desired the olefinic compound is continuously passed to said catalytic oxidation zone, water is continuously added to the electrolytic oxidation zone, and the oxidized olefinic compound is continuously recovered from the catalytic oxidation zone.

The duration of time over which the process of our invention is carried out can vary widely as can the temperature range. Normally the oxidation reaction time varies from about 5 minutes to 24 hours and the oxidation reaction is carried out at a temperature in the range of about 5 to 100° C. Desirable results have been obtained where the temperature is in the range of about 20 to 75° C.

In order to illustrate further to those skilled in the art the nature of the present invention and how it can be practiced the following examples are given. As indicated, the examples are set forth primarily for the purpose of illustration and accordingly, any enumeration of details contained therein should not be interpreted as a limitation on the invention except as such are expressed in the appended claims.

EXAMPLE I

An experiment was conducted employing the process of the present invention for the oxidation of olefinic compounds. The electrochemical cell consisted of two electrochemical half cells separated by a permselective cation exchange membrane. The cathode was a carbon rod and the anode consisted of four (4) concentric lead cylinders. A reaction chamber, in which the oxidation of the olefinic compounds occurred, was arranged so as to be separate from the electrochemical cell but in fluid communication with the anolyte.

The cathode compartment was filled with 150 ml. of an aqueous solution containing 5% by weight tetramethyl ammonium hydroxide pentahydrate. The anolyte compartment was filled with 200 cc. of an aqueous solution formed by admixing 50 grams of sodium iodate and 50 ml. of 98 percent sulfuric acid to 950 ml. of water. In the reaction chamber was placed 100 ml. of benzene, 0.3 ml. of methyl tricaprylyl ammonium chloride, 5.6 grams of octene-1 and 25 ml. of aqueous $O_sO_4$ (0.1 g. of $O_sO_4$).

The anolyte was then pumped upward through the reaction cell. A current of 1 amp was then applied for a period of about 23 hours while the anolyte was continuously pumped through the anode compartment and the reaction chamber. Aliquots of 0.2 ml. of the organic phase (benzene) were taken at regular intervals and analyzed. At the end of 7 hours, 10–15% heptaldehyde had been formed as determined by gas chromatography. At the end of 23 hours approximately 50% of the olefinic compound had been oxidized to its aldehyde.

EXAMPLE II

This example illustrates the use of ruthenium dioxide as the catalyst component in the oxidation of olefin compounds by the process of the present invention. The electrochemical cell was a simplified, small version of that described by Mantell in "I and EC Process Design and Development" 1, 144 (1962), and "Chem. Eng.," June 5, 1967, pp. 129–135.

The anode compartment of the electrochemical cell was charged with 1500 ml. of an aqueous solution containing 17 weight percent iodic acid. The cathode compartment was charged with 1500 ml. of an aqueous solution containing 5 weight percent sodium hydroxide. The reaction chamber, which was separated from the electrochemical cell but in fluid communication with the anode compartment was charged with 100 ml. n-hexane, 11 grams of octene-1, 0.0605 gram of $RuO_2$ and 0.5 gram of methyltricaprylyl ammonium chloride. The aqueous solution was electrolyzed at 10 amp (5–6 volt) for 18 hours. The organic layer was collected and the aqueous (anolytic) phase was extracted with n-hexane. Chromatography indicated the mixture contained 98 percent acids, about 1 percent olefin, and 1 percent aldehyde, in hexane. The combined organic solution was extracted with aqueous base. The aqueous carboxylic acid salt solution was acidified, and the acids extracted with hexane. The hexane solution was dried and spin evaporated to give 1.9 g. of acids (94 percent heptanoic, some hexanoic, and some pentanoic acid) in 20 percent n-hexane.

The above described apparatus with the electrolyte solutions from the previous reaction was charged with 0.0782 g. $RuO_2$, 100 ml. n-hexane, 11 g. octene-1, and 0.5 g. methyltricaprylyl ammonium chloride. The cell was operated at 20–20 amp (5–10 volt) for 19 hours and the organic layer was separated. Yield 1.8 g. of heptanoic acid in hexane.

EXAMPLE III

A series of oxidation reactions were conducted wherein known processes were attempted to produce carbonyl compounds. For example, it is well known that manganous sulfate in the presence of sulfuric acid gives good yields of permanganate on electrolysis. However, when 1-hexene in diethyl ether was admixed with an aqueous solution of permanganate for a period of 24 hours while permanganate was being generated, no oxidation products of the 1-hexene could be detected by gas chromatography.

Polyphosphoric acid was then added to a mixture similar to that described above. On electrolysis a heavy precipitate was formed and no olefin oxidation products could be detected.

The above Examples I and II clearly show a unique process for producing carbonyl compounds from olefinic compounds which combines electrochemistry and metallic catalysis which results in an extremely clean reaction with net consumption of water and electricity and no loss of expensive catalysts. In addition, Example III shows the uniqueness of the present invention and that other well known processes do not combine to give the desired electrochemical oxidation with net consumption of electrical power and water.

Having thus described the invention, we claim:
1. The method of oxidizing an olefinic compound by catalytic oxidation wherein the catalytic oxidation agent is continuously regenerated which consists essentially of:
(a) providing an electrolytic oxidation zone having an anolyte-containing zone and a catholyte-containing zone, said two latter zones being in electrical communication with each other and being physically separated by a semi-permeable membrane, said anolyte-containing zone containing as anolyte an aqueous solution containing from about 0.001 to 2 weight percent of a catalytic oxidation agent wherein said catalytic oxidation agent is selected from the group consisting of a Group VIII metal, an oxide of a Group VIII metal, or an inorganic salt compound containing a Group VIII metal and from about 1 to 50 weight percent of a catalyst regeneration agent, and said catholyte-containing zone contains as catholyte an aqueous solution of from about 1 to 20 weight percent of an alkali metal hydroxide or quaternary ammonium hydroxide;

(b) providing a catalytic oxidation zone which is separated from said electrolytic oxidation zone but in fluid communication with said anolyte containing zone, said catalytic oxidation zone containing an organic solution of from about 1 to 100 weight percent olefinic compound and up to about 99 weight percent inert organic solvent;

(c) continuously circulating anolyte between said catalytic oxidation zone and said anolyte-containing zone, whereby said olefinic compound is oxidized by said catalytic oxidation agent, which latter agent is itself thereby reduced, and whereby the thus-reduced catalytic agent is reoxidized by said catalyst regeneration agent, which latter agent is itself thereby reduced;

(d) continuously passing electrical current between said catholyte-containing zone and said anolyte-containing zone, whereby said reduced catalyst regeneration agent is reoxidized, and hydrogen is liberated from said catholyte-containing zone; and (e) withdrawing from said catalytic oxidation zone oxidized olefinic compound product.

2. The method of claim 1 wherein said catalytic oxidation agent is present in an amount of from about 0.01 to 0.2 weight percent and is selected from the group consisting of ruthenium tetraoxide, ruthenium dioxide or osmium tetraoxide.

3. The method of claim 2 wherein said anolyte includes from about 0.1 to 2 weight percent a quaternary ammonium salt or a quaternary phosphonium salt.

4. The method of claim 3 wherein said inert organic solvent is selected from the group consisting of a halogenated organic compound, a ketone, a carboxylic acid containing from about 3 to 10 carbon atoms, paraffins containing from about 5 to 30 carbon atoms and aromatic hydrocarbons.

5. The method of claim 4 wherein said olefinic compound is selected from the group consisting of olefins having from about 2 to 40 carbon atoms, oleic acid, linoleic acid, methyl oleate, and soybean oil.

6. The method of claim 5 wherein said olefinic compound is an olefin having from about 2 to 18 carbon atoms.

7. The method of claim 6 wherein said oxidation is conducted at a temperature in the range of from about 5° to 100° C. for a period of time from about 5 minutes to about 24 hours and said electrical current passed between said catholyte-containing compartment and said anolyte-containing compartment is at least 100% the theoretical amount.

8. The method of claim 6 wherein said method is a continuous method and said olefinic compound is continuously passed into said catalytic oxidation zone and make-up water is continuously added to said electrolytic oxidation zone.

9. The method of claim 7 wherein said anolyte contains about 15 weight percent sodium iodate, about 20 weight percent sulfuric acid, and about 0.05 weight percent methyl tricaprylyl ammonium chloride, said catalytic oxidation agent is osmium tetraoxide, said organic solution contains about 5 weight percent octene-1 and about 95 weight percent benzene solvent and said catholyte contains about 5 weight percent tetramethyl ammoium hydroxide pentahydrate.

10. The method of claim 7 wherein said anolyte contains about 17 weight percent iodic acid, about 0.5 weight percent methyl tricaprylyl ammonium chloride, and about 0.06 weight percent ruthenium dioxide, said organic solution contains about 10 weight percent octene-1 and about 90 weight percent n-hexane solvent, and said catholyte contains about 5 weight percent sodium hydroxide.

References Cited

UNITED STATES PATENTS

| | | | |
|---|---|---|---|
| 3,479,262 | 11/1969 | Mac Lean et al. | 204—80 |
| 3,481,845 | 12/1969 | Fenton | 204—80 |

JOHN H. MACK, Primary Examiner

R. L. ANDREWS, Assistant Examiner